United States Patent [19]

Rolnick

[11] 4,097,182

[45] Jun. 27, 1978

[54] COMBINATION TAP AND DIE WRENCH

[75] Inventor: Edward M. Rolnick, North Dartmouth, Mass.

[73] Assignee: Gulf & Western Manufacturing Company, Southfield, Mich.

[21] Appl. No.: 826,797

[22] Filed: Aug. 22, 1977

[51] Int. Cl.$^2$ .................. B23B 31/10; B23G 5/04
[52] U.S. Cl. ........................ 408/239 R; 10/123 S
[58] Field of Search ............. 408/238, 239, 240, 241; 10/123 R, 123 S, 123 P

[56] References Cited

FOREIGN PATENT DOCUMENTS

| 459,206 | 8/1949 | Canada ............................. 408/239 |
| 1,382,169 | 11/1964 | France ............................. 10/123 R |
| 186,743 | 10/1922 | United Kingdom ............... 10/123 S |

*Primary Examiner*—Harrison L. Hinson

*Attorney, Agent, or Firm*—Gregory J. Battersby; Thomas E. Harrison, Jr.

[57] ABSTRACT

A combination tap and die wrench is provided having a center portion and a pair of opposite arm portions extending outwardly from the center portion. The wrench is preferably fabricated from a material with a high strength per weight ratio such as aluminum. The center portion which is circular with a pair of opposed flat surfaces includes a central aperture extending through the thickness thereof from one of the opposed surfaces to the opposite surface. The central aperture is adapted to receive and positively retain tapping apparatus. At least one round, depressed receptacle is provided on each of the surfaces of the center portion about the central aperture for receiving and positively retaining a threading die.

6 Claims, 7 Drawing Figures

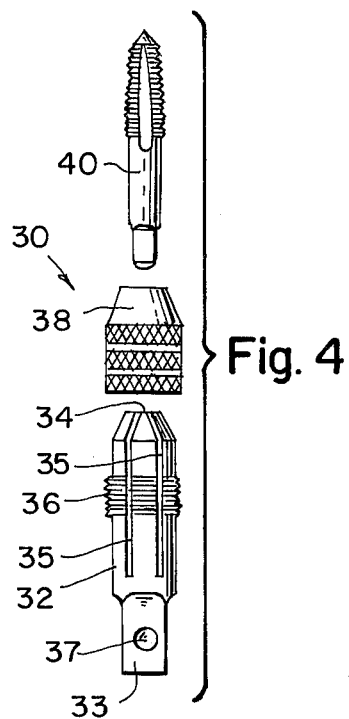
Fig. 4
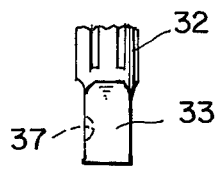
Fig. 5
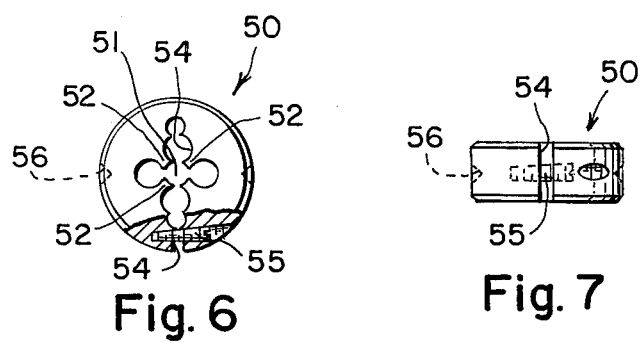
Fig. 6
Fig. 7

COMBINATION TAP AND DIE WRENCH

BACKGROUND OF THE INVENTION

The present invention relates generally to a combination tap and die wrench and, more particularly, to a tap and die wrench adapted to interchangeably receive and retain both taps and dies of the same or different dimension.

Heretofore, it was necessary to use separate wrenches for taps and for dies and still further individual tap and die wrenches for different dimension taps and dies. This resulted in a mechanic being required to stock not only individual taps and dies of different dimension but also different wrenches to accommodate each of the taps and dies. To minimize the necessity for having to stock these numerous wrenches of different type and dimension, some manufactures have provided universal tap and die wrenches however most of these wrenches required an actual interchange of tap with die prior to use. Additonally, most were not truly universal in that they failed to provide a receptacle for more than one outside dimension die.

Attempts have been made to incorporate multiple receptacles for both taps on a single wrench. See, for example, the combination wrenches described in U.S. Pat. No. 1,148,406 which issued to E. G. Reid on July 27, 1915; U.S. Pat. No. 1,771,811 which issued to O. Nelson on July 29, 1930; and U.S. Pat. No. 3,004,270 which issued to W. E. Cowley on Oct. 17, 1961. None of these wrenches, however, permit the simultaneous mounting of both taps and dies on a single wrench thus necessitating the interchange of a tap with a die. Additionally, see concurrently filed patent application Ser.-/No. 826,439 filed Aug. 22, 1977 in the name of the same inventor also entitled "Combination Tap and Die Wrench" which is directed to a wrench including a plurality of die receiving receptacles on oppositely extending arm portions.

Against the foregoing background, it is a primary objective of the present invention to provide a combination tap and die wrench capable of receiving and positively retaining both taps and dies.

It is another object of the present invention to provide a combination tap and die wrench adapted to receive and positively retain taps and dies of different dimensions.

It is still another object of the present invention to provide a combination tap and die wrench which offers a high degree of leverage.

SUMMARY OF THE INVENTION

To the accomplishments of the foregoing objects and advantages, the present invention briefly comprises a combination tap and die wrench having a center portion and a pair of opposite arm portions extending outwardly from the center portion The wrench is preferably fabricated from a material with a high strength per weight ratio such as aluminum. The center portion which is circular with a pair of opposed flat surfaces includes a central aperture extending through the thickness thereof from one of the opposed surfaces to the opposite surface. The central aperture is adapted to receive and positively retain tapping apparatus. At least one round, depressed receptacle is provided on each of the surfaces of the center portion about the central aperture for receiving and positively retaining a threading die.

BRIEF DESCRIPTION OF THE DRAWINGS

The foregoing and still other objects and advantages of the present invention will be more apparent from the following detailed explanation of the invention in connection with the accompanying drawings wherein:

FIG. 4 is a side view of the tapping apparatus which may be used with the wrench of FIG. 1;

FIG. 5 is a side view of the base portion of the tapping apparatus of FIG. 4;

FIG. 6 is a top plan view of a die which may be used with the wrench of FIG. 1; and FIG. 7 is a side view of the die of FIG. 6.

DETAILED DESCRIPTION OF THE INVENTION

Figure 1:
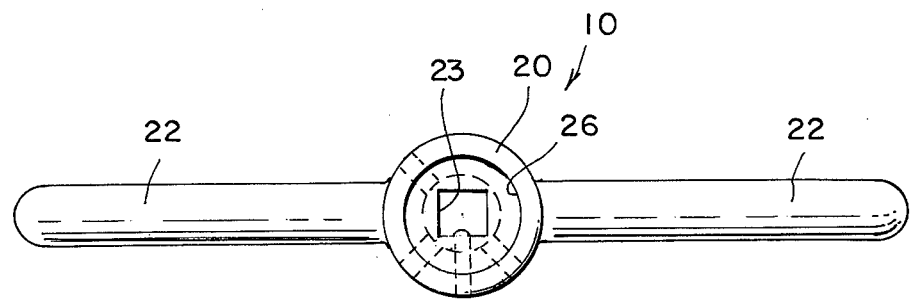
FIG. 1 is a top plan view of the wrench of the present invention.

Referring now to the drawings and, in particular, to FIG. 1 thereof, there is provided a combination tap and die wrench identified generally by reference numeral 10. Wrench 10, which may be fabricated from virtually any high strength and low weight material such as, for example, a thermoplastic material, aluminum or magnesium, includes a circular center portion 20 with two opposite flat surfaces and two arm portions 22 extending oppositely and outwardly from the center portion 20. Arm portions 22 are rounded and are adapted to be gripped by the user of the wrench 10.

Figure 2:
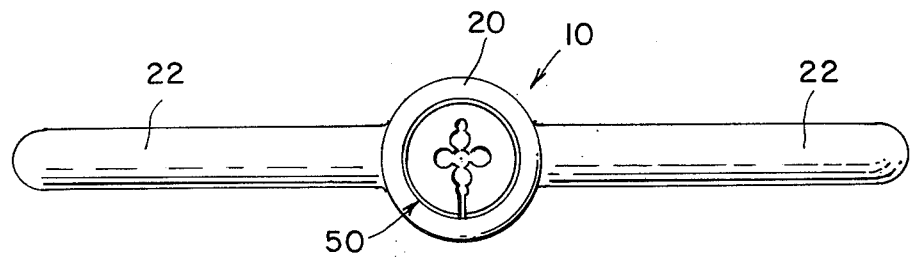
FIG. 2 is a top plan view of the wrench of FIG. 1 containing a die.
Figure 3:
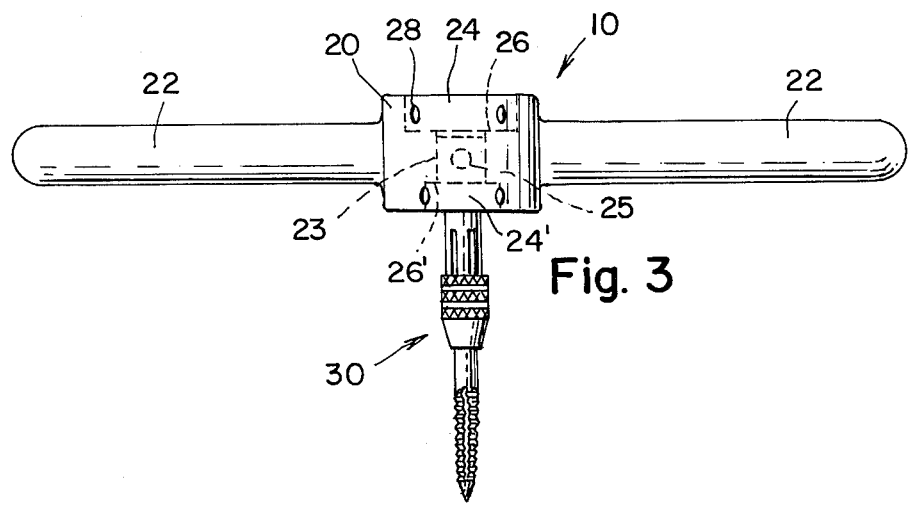
FIG. 3 is a side view of the wrench of FIG. 1 including tapping apparatus.

The center portion 20 includes a central aperture 23 which extends through the thickness of the center portion 20 from one of the flat surfaces to the oppositely opposed surface. Central aperture 23 is square or rectangular in shape and is adapted to receive and positively retain tapping apparatus 30 as will be described. Tapping apparatus 30 may be inserted into the central aperture 23 from either of the two opposed surfaces of the wrench 10. The center portion 20 further includes, on both opposed surfaces about the central aperture, depressed circular receptacles 24 and 24' each adapted to receive and positively retain a threading die 50 as shown in FIG. 2. Receptacles 24 and 24' may be of the same or different diameter. When they are of different diameters as shown in FIG. 3, thus permits the wrench 10 to accommodate a greater spectrum of die cutting diameters since the wrench would be able to receive dies of two different outside diameters thus accommodating a broader spectrum of cutting diameters. Shoulders 26 and 26' are provided at the base of the receptacles 24 and 24' to support the dies 50.

By having the receptacles 24 and 24' positioned about the central aperture 23 when desired and when tapping apparatus 30 is not simultaneously mounted from the opposite surface of the wrench 10, central aperture 23 serves as a passageway for already threaded stock to pass during a die threading operation.

Tapping apparatus 30 may be introduced from either of the opposite surfaces and is retained within the central aperture 23 by means of a screw adjusted spring loaded ball plunger 25 which extends through the wall of the center portion 20 into the central aperture 23 and which is adapted to positively engage the tapping apparatus 30. It will be understood that, when desired, the spring loaded ball plunger may be provided on tapping apparatus 30. Tapping apparatus 30 is of a conventional commercial design and, as shown in FIGS. 4 and 5, includes a tubularly shaped tap chuck 32, a nose piece 38 and a tap 40. Tubularly shaped tap chuck 32 includes a square or rectangular base 33 of such shape and dimension as to be received and positively retained within the aperture 23 of the center portion 21 of wrench 10, and an elongated tubular portion 34 open at the end opposite the base 33. The open end of tubular portion 34 is adapted to receive and retain a tap 40 of pre-determined size and shape. The tubular portion 34 of the chuck 32 is tapered from a point midway between the open end and the base 33 toward its open end and includes at least two and preferably four longitudinally extending slots 35 extending from the base portion to its open end. A threaded portion 36 is further provided on the external surface of the tubular portion for threadably engaging the nose piece 38 in order to retain the tap 40 within the chuck 32. The base 33 includes on at least one of its surfaces an indented spot 37 for engaging the spring loaded ball plunger 25 of the wrench 10 in order to positively retain the tap chuck 32 within the aperture 23 of the wrench 10. The nose piece 38 is internally threaded and open at both ends. The internally threaded portion of nose piece 38 is adapted to threadably engage the threaded portion 36 on the external surface of the tap chuck 32 in such a manner as to, when a tap 40 is inserted into the open end of tap chuck 32, compress the tubular portion 34 of the chuck at the slots 35 about the tap 40, to positively retain the tap 40 within the chuck 32.

Conventional extension shafts may be used with the tapping apparatus 30 to provide increased accessibility.

As shown in greater detail in FIGS. 6 and 7, the threading dies 50, which are of a conventional commercial design, are circular in shape with threaded cutting surfaces or lands 52 circumfrentially positioned about a centrally positioned internal aperture 51 which extends through the thickness of the die 50. As shown in particular in FIG. 6, the cutting lands 52 may include three and in some instances four or more individual cutting surfaces. The actual cutting dimension of the die 50 is determined by the inside diameter of the circumfrential cutting lands 52 which may be adjusted by an adjusting screw 55. It will be appreciated that various dies of different cutting dimensions may all have the same external die diameter thus permitting the wrench 10, which may include two receptacles of different diameters, to accept a broad dimensional spectrum of dies. Aperture 54, which extends through the thickness of the die 50, allows the cutting dimension of the die 50 to be adjusted using the adjusting screw 55. Notches or depressions 56 are provided on the outside surface of the dies 50 for receiving and engaging the V-shaped tip portions of the set screws 28 of the wrench 10 when the die 50 is positioned within the receptacle 24 so as to secure the die 50 within receptacles 24 of the wrench 10.

In actual use, a mechanic may use the wrench as either a tap wrench, a die wrench or a combination tap and die wrench as it will accommodate at any one time tapping apparatus, one or two dies of the same or different dimension or tapping apparatus and a die. The dimensional combinations are virtually unlimited. Moreover, the central position of the aperture 23 and the receptacles 24 and 24' and the outwardly and oppositely extending arm portions 22 provide good leverage during use.

Having thus described the invention with particular reference to the preferred forms thereof, it will be obvious that various changes and modifications may be made therein without departing from the spirit and scope of the invention as defined in the appended claims.

Wherefore I claim:

1. A combination tap and die wrench having a center portion and a pair of opposite arm portions extending outwardly from the center portion, said center portion including a pair of opposed flat surfaces with a central aperture extending through the thickness thereof from one of said surfaces to the opposite surface, and at least one receptacle on each of said surfaces about said central aperture, wherein said central aperture is adapted to receive and positively retain tapping apparatus and wherein each of said receptacles is adapted to receive and positively retain a threading die therein.

2. The wrench of claim 1 wherein said central aperture is square and wherein said receptacles are round.

3. The wrench of claim 1 wherein said center portion is generally circular and wherein said arm portions are rounded.

4. The wrench of claim 1 wherein a screw adjusted spring loaded ball plunger is provided extending through the center portion into the central aperture to positively retain the tapping apparatus within the central aperture.

5. The wrench of claim 1 wherein at least two set screws are provided about each of the receptacles to positively retain the dies within the receptacle.

6. The wrench of claim 1 wherein said wrench is fabricated from aluminum.

* * * * *